United States Patent
Obayashi et al.

(10) Patent No.: US 9,529,792 B2
(45) Date of Patent: Dec. 27, 2016

(54) GLOSSARY MANAGEMENT DEVICE, GLOSSARY MANAGEMENT SYSTEM, AND RECORDING MEDIUM FOR GLOSSARY GENERATION

(71) Applicant: KYOCERA Document Solutions Inc., Osaka (JP)

(72) Inventors: Yuichi Obayashi, Osaka (JP); Chika Tsuji, Osaka (JP); Katsuhiro Minoru, Osaka (JP); Takeshi Nakamura, Osaka (JP); Takashi Nomura, Osaka (JP); Jumpei Takagi, Osaka (JP); Daisuke Yoshida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/862,981

(22) Filed: Sep. 23, 2015

(65) Prior Publication Data

US 2016/0092436 A1 Mar. 31, 2016

(30) Foreign Application Priority Data

Sep. 25, 2014 (JP) ................................ 2014-194569

(51) Int. Cl.
| | |
|---|---|
| G06F 17/27 | (2006.01) |
| G06F 17/28 | (2006.01) |
| G06F 17/22 | (2006.01) |
| H04N 1/00 | (2006.01) |
| G09B 19/06 | (2006.01) |

(52) U.S. Cl.
CPC ....... *G06F 17/2735* (2013.01); *G06F 17/2276* (2013.01); *G06F 17/2705* (2013.01); *G06F 17/275* (2013.01); *G06F 17/2863* (2013.01); *H04N 1/00244* (2013.01); *G09B 19/06* (2013.01); *H04N 2201/0094* (2013.01)

(58) Field of Classification Search
CPC G06F 17/2735; G06F 17/275; G06F 17/2276; G06F 17/2863
USPC ........................... 358/1.11, 538; 704/7, 9, 10
See application file for complete search history.

(56) References Cited

U.S. PATENT DOCUMENTS

| | | | |
|---|---|---|---|
| 5,440,481 A * | 8/1995 | Kostoff | G06F 17/2715 |
| 2003/0233235 A1* | 12/2003 | Park | G06F 17/278 704/257 |
| 2006/0271527 A1* | 11/2006 | Kutsumi | G06F 17/2735 |

(Continued)

FOREIGN PATENT DOCUMENTS

JP 2013-072973 A 4/2013

*Primary Examiner* — Jamares Q Washington
(74) *Attorney, Agent, or Firm* — Studebaker & Brackett PC

(57) ABSTRACT

A glossary management device includes a read circuit, a storage circuit, an acquisition circuit, an analysis circuit, a term matching circuit, and a registration circuit. The storage circuit has a storage area for a glossary. The acquisition circuit acquires text data of a document if reading of the document is executed by a user. The analysis circuit performs analysis of the text data acquired by the acquisition circuit to identify a language of the document and parts of speech of text segments in the text data and extracts one or more text segments from the document based on the analysis. The term matching circuit performs matching for each of the extracted text segments against a public dictionary. The registration circuit adds to the glossary, each extracted text segment that does not match any entry term in the public dictionary.

13 Claims, 5 Drawing Sheets

(56) References Cited

U.S. PATENT DOCUMENTS

| | | | |
|---|---|---|---|
| 2011/0208728 A1* | 8/2011 | Ikawa | G06F 17/277 707/723 |
| 2012/0226491 A1* | 9/2012 | Yamazaki | G10L 15/06 704/8 |
| 2012/0331003 A1* | 12/2012 | Chu-Carroll | G06N 5/02 707/771 |

* cited by examiner

GLOSSARY MANAGEMENT DEVICE, GLOSSARY MANAGEMENT SYSTEM, AND RECORDING MEDIUM FOR GLOSSARY GENERATION

INCORPORATION BY REFERENCE

The present application claims priority under 35 U.S.C. §119 to Japanese Patent Application No. 2014-194569, filed Sep. 25, 2014. The contents of this application are incorporated herein by reference in their entirety.

BACKGROUND

The present disclosure relates to a glossary management device, a glossary management system, and a recording medium that are each for generating a glossary.

Extensive reading is generally acknowledged as an effective method of both first language and foreign language learning. Presently, learners can acquire and read a large amount of reading materials over the Internet.

Unfortunately, reading materials available on the Internet are usually not generated for learners of a specific level and such materials may not be appropriate for language learning in their acquired form.

In view of the above, in an example of a technique related to English learning, English terms (such as words, phrases, and idioms) appearing in text as acquired are assigned an attribute indicating "learned" if the terms have already been learned by a user. Terms that are in the process of being learned by the user are assigned an attribute indicating "being learned". Then, the acquired English text is converted into simpler English text. For the purpose of acquiring English text suitable for English learning, the conversion involves replacement to terms having an attribute of "learned" or "being learned". For the purpose of acquiring English text that is easier to understand, the conversion involves replacement to only those terms having an attribute of "learned".

SUMMARY

A glossary management device according to an aspect of the present disclosure includes either or both of a read circuit and an output circuit, a storage circuit, an acquisition circuit, an analysis circuit, a term matching circuit, and a registration circuit. The read circuit reads a document. The output circuit outputs the document. The storage circuit has a storage area for a glossary to which text segments extracted from the document that is read by the read circuit or output by the output circuit are to be added as entry terms. The acquisition circuit acquires text data of the document. The analysis circuit: performs analysis of the text data acquired by the acquisition circuit to identify a language of the document and parts of speech of text segments in the text data; and extracts one or more text segments from the document based on the analysis. The term matching circuit performs matching for each of the extracted text segments against a public dictionary containing entry terms registered therein. The registration circuit adds to the glossary, each extracted text segment that does not match any entry term in the public dictionary.

A glossary management system according to an aspect of the present disclosure includes: an image forming apparatus and an information processing device. The information processing device communicates with the image forming apparatus over a network. The image forming apparatus includes a processing circuit, a collection circuit, and a transmission circuit. The processing circuit executes a job of copying or printing a document. The collection circuit collects from the document, text segments to be added to a glossary as entry terms. The transmission circuit transmits the text segments collected by the collection circuit to the information processing device. The information processing device includes a storage circuit, a reception circuit, and a registration circuit. The storage circuit has a storage area for the glossary. The reception circuit receives the text segments transmitted from the information processing device. The registration circuit adds each of the text segments received by the reception circuit to the glossary.

A non-transitory computer-readable recording medium according to an aspect of the present disclosure stores a glossary management program executable by a computer. The glossary management program includes a first program code to a fourth program code. The first program code causes the computer to acquire text data of a document. The second program code causes the computer to perform analysis of the text data to identify a language of the document and parts of speech of text segments in the text data and to extract one or more text segments from the document based on the analysis. The third program code causes the computer to perform matching for each of the extracted text segments against a public dictionary containing entry terms registered therein. The fourth program code causes the computer to add to a glossary, each extracted text segment that does not match any entry term in the public dictionary.

DETAILED DESCRIPTION

Figure 1:
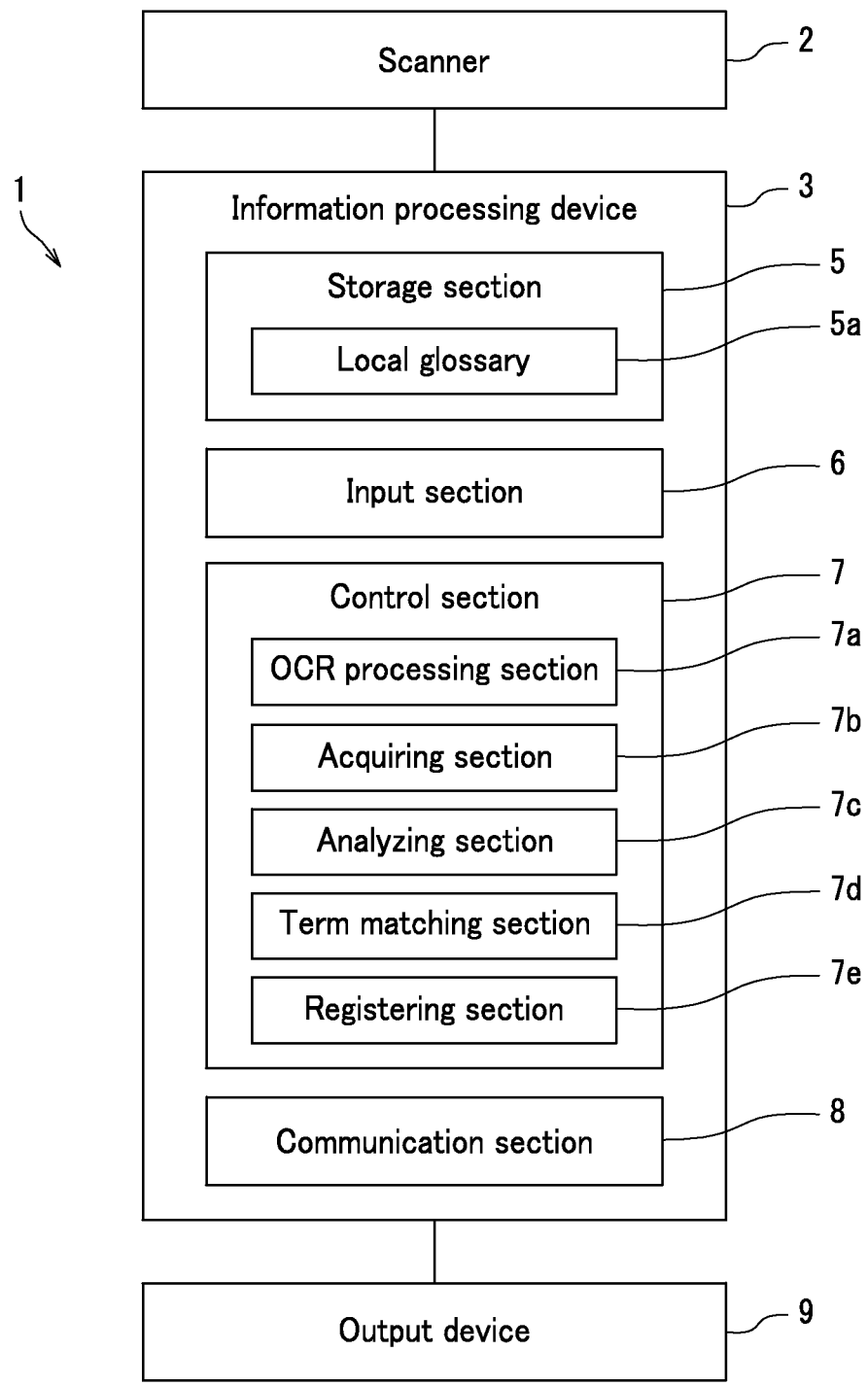
FIG. 1 shows a structure of a glossary management device.

An embodiment of the present disclosure will be described below with reference to the accompanying drawings.

[Overview]

First, an overview of a glossary management device according to the embodiment of the present disclosure is described. The glossary management device according to the present disclosure generates a glossary by collecting text segments without requiring a user to add text segments. The glossary management device according to the present disclosure operates under the assumption that a common document-related job (such as copying or printing) is executed by a user for a purpose other than collecting text segments to be added to the glossary.

The glossary management device according to the present disclosure performs a first-phase process. In the first-phase process, during or after execution of a common document-related job (such as copying or printing of a document) instructed by a user, the glossary management device collects (i.e., extracts) text segments to be added to the glossary from the document processed in the job. As noted above, the common document-related job is executed for a purpose unrelated to the collection of text segments.

In a second-phase process, the glossary management device according to the present disclosure determines whether or not to add each collected text segment to the glossary and adds each text segment determined to be added.

The determination as to whether or not to add a text segment may be made in view of whether the document processed in the job is an internal document or an external document of a specific organization, such as a company.

In addition, the glossary management device may determine to add each collected text segment that is a noun or a verb.

The determination as to whether or not to add an extracted text segment may be made based on a set of conditions (A) and (B) below:

(A) The document from which of the text segment is extracted is in Japanese; and (B) If the document is in Japanese, the text segment is composed only of alphabetic characters and also the text segment is a proper noun.

Through the first- and second-phase processes described above, the glossary management device according to the present disclosure can appropriately collect and select text segments to be added to the glossary. This ensures that the glossary is generated appropriately for the intended use.

In addition, the user does not have to go through the trouble of generating the glossary.

In addition, the glossary that the glossary management device generates by collecting terms may be modified by adding the definitions of the terms. This increases the utility of the glossary.

In the following description, the glossary managed by the glossary management device is referred to as a local glossary. In contrast, a glossary or dictionary publicly available over a network such as the Internet and not managed by the glossary management device of the present disclosure is referred to as a public dictionary.

The above has described an overview of the glossary management device according to the embodiment of the present disclosure.

[Structure]

Next, the following describes a structure of the glossary management device according to the present disclosure. In the following, the structure of the glossary management device is described first. Then, an implementation of the glossary management device as an image forming apparatus (multifunction peripheral (MFP)) is described, followed by an implementation of the glossary management device as a client-server system over a network.

(Structure of Glossary Management Device)

FIG. 1 shows a structure of a glossary management device 1. The glossary management device 1 includes a scanner 2, an information processing device 3, and an output device 9.

The scanner 2 is used by a user to read an original (that is a document) in a common document-related job described above. Examples of such a common document-related job include copying of a document and electronic conversion of a document.

The output device 9 outputs a document (for example, through display, printing, or transmission). The document is electronic data that is stored in the information processing device 3 or the output device 9. The output device 9 is for example a display device (such as a display), a printing device (such as a printer), or a network device. The network device transmits data to an external device residing on the network. The output device 9 is used by a user in a common document-related job described above. Examples of such a common document-related job include browsing of document content, document printing, document copying, and document transmission to another device over a network.

The information processing device 3 may be implemented by a computer. The information processing device 3 includes a storage section 5, an input section 6, a control section 7, and a communication section 8.

The storage section 5 is a circuit provided with a storage area that stores, for example, work data and a local glossary 5*a*. Work data refers to data used by the control section 7 in later-described processes. The local glossary 5*a* is a list of collected terms.

The input section 6 is a circuit that receives instructions input by the user.

The control section 7 is a processor that executes the first- and second-phase processes described in the "Overview". Details of the processes will be described later. The control section 7 includes an optical character recognition (OCR) processing section 7*a*, an acquiring section 7*b*, an analyzing section 7*c*, a term matching section 7*d*, and a registering section 7*e*.

The OCR processing section 7*a* generates electronic text data through optical text recognition from image data of an original read by the scanner 2. Note that the scanner 2 and the OCR processing section 7*a* together correspond to a read circuit.

The acquiring section 7*b* is a circuit that acquires text data of a document. Text data is generated by the OCR processing section 7*a* or received by the communication section 8.

The analyzing section 7*c* is a circuit that performs analysis of the text data acquired by the acquiring section 7*b* to identify the language of the document corresponding to the text data and extracts text segments from the analyzed text data.

The term matching section 7*d* performs matching of each extracted text segment against a public dictionary. More specifically, the term matching section 7*d* determines whether each text segment matches any entry term in the public dictionary. If an entry word matching the extracted text segment is found in the public dictionary, the term matching section 7*d* determines that there is a match.

The registering section 7*e* is a circuit that adds a text segment and location information of the text segment to the local glossary 5*a*. Note that the registering section 7*e* adds to the local glossary 5*a*, each text segment corresponding to an analysis result by the analyzing section 7*c* that satisfies a specific condition or a matching result by the term matching section 7*d* that satisfies a specific condition. The location information indicates the location of the text segment within the document from which the text segment is extracted.

The communication section 8 is a circuit for data transmission between the information processing device 3 and an external source.

Where the output device 9 is a network device, the network device may double as the communication section 8.

The above has described the structure of the glossary management device 1.

(Implementation of Glossary Management Device as Image Forming Apparatus)

Figure 2:
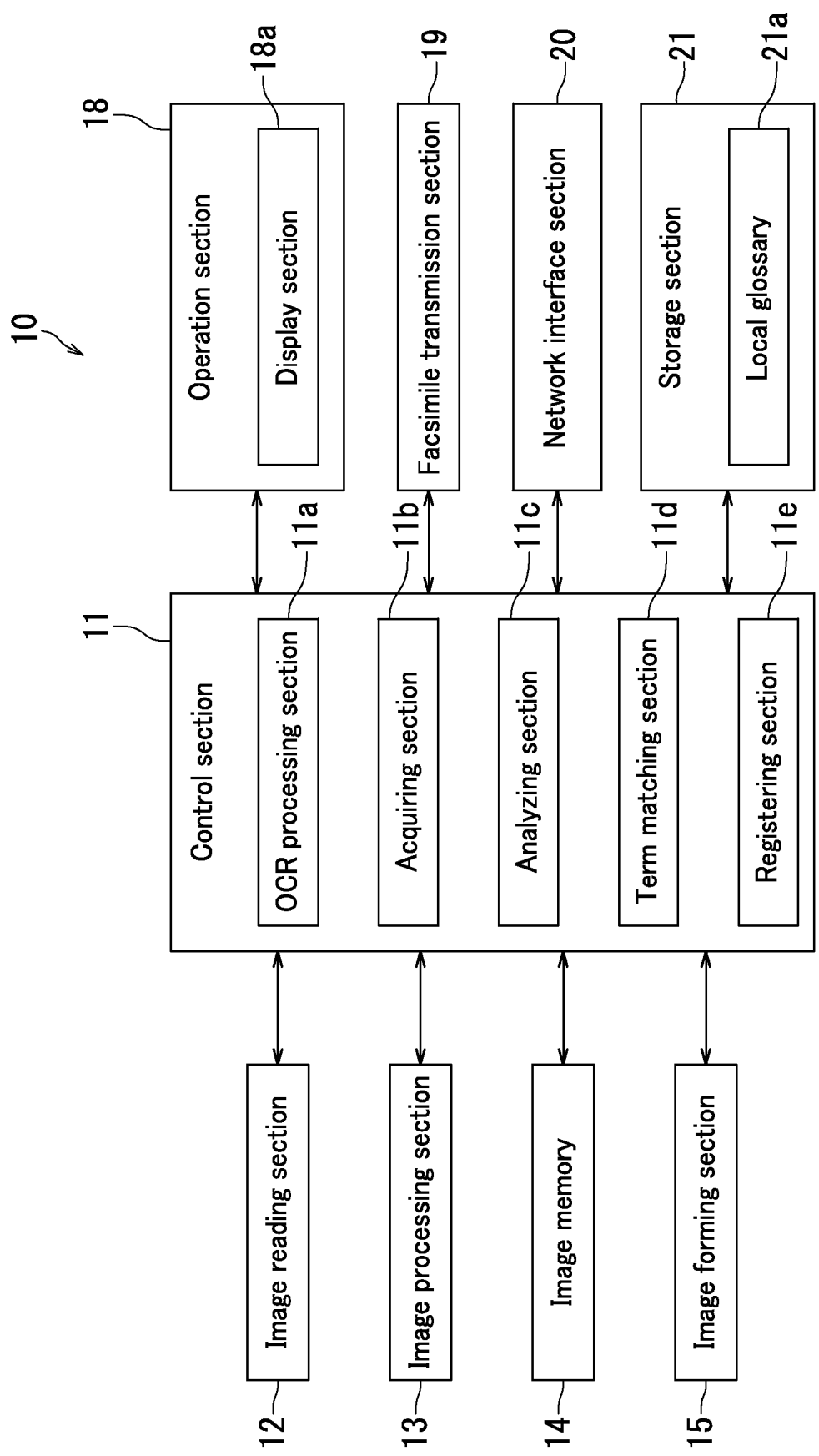
FIG. 2 shows a structure of an image forming apparatus.

The following describes an implementation of the glossary management device as an image forming apparatus 10. FIG. 2 shows a structure of the image forming apparatus 10.

The image forming apparatus 10 includes a control section 11, an image reading section 12, an image processing section 13, an image memory 14, an image forming section 15, an operation section 18, a facsimile transmission section 19, and a storage section 21. The control section 11 is a processor that includes, for example, a central processing unit (CPU), random access memory (RAM), read only memory (ROM), and a dedicated hardware circuit. The control section 11 performs overall control of the image forming apparatus 10.

The control section 11 is connected to, for example, the image reading section 12, the image processing section 13, the image memory 14, the image forming section 15, the operation section 18, the facsimile transmission section 19, a network interface section 20, and the storage section 21. The control section 11 controls operation of the sections (blocks) connected thereto and transmission of signals and data to and from the blocks.

Upon receipt of a job execution instruction from a user, the control section 11 operates and controls processing of the blocks to execute a necessary function (for example, the scanner function, the printing function, the copy function, and the facsimile transmission function). The job execution instruction is input by the user through the operation section 18 or through a personal computer (PC) or other device. The PC or other devices are connected over the network.

The control section 11 also performs the processes described in the above "Overview".

The control section 11 includes an OCR processing section 11a, an acquiring section 11b, an analyzing section 11c, a term matching section 11d, and a registering section 11e.

The sections of the control section 11 of the image forming apparatus 10 (the OCR processing section 11a, the acquiring section 11b, the analyzing section 11c, the term matching section 11d, and the registering section 11e) correspond to the sections of the control section 7 of the glossary management device 1 described above (respectively correspond to the OCR processing section 7a, the acquiring section 7b, the analyzing section 7c, the term matching section 7d, and the registering section 7e). The sections of the control section 11 of the image forming apparatus 10 operate as functional blocks that are implemented by the CPU through execution of a program loaded to the RAM from the ROM, for example.

The image reading section 12 is a circuit that reads an image of an original. The image reading section 12 corresponds to the scanner 2 of the glossary management device 1 described above.

The image processing section 13 is a circuit that performs image processing as necessary on image data representing an image read by the image reading section 12. For example, the image processing section 13 performs image processing (such as shading correction) on image data read by the image reading section 12 in order to improve the image quality.

The image memory 14 is a circuit provided with a storage area for temporarily storing data. Examples of data to be stored in the image memory include image data of an original read by the image reading section 12 and data targeted for printing by the image forming section 15.

The image forming section 15 is a circuit that forms an image (for example by printing) based on, for example, image data generated by the image reading section 12. The image forming section 15 corresponds to the output device 9 of the glossary management device 1 described above.

The operation section 18 is a circuit provided with a touch panel section and an operation key section. The touch panel section and the operation key section are used by the user to input instructions for an operation or a job executable on the image forming apparatus 10. The touch panel section includes a display 18a. The display 18a may for example be a liquid crystal display (LCD) provided with a touch panel.

The operation section 18 corresponds to the input section 6 of the glossary management device 1 described above.

The facsimile transmission section 19 is a circuit provided with an encoder/decoder, a demodulator, and a network control unit (NCU). The facsimile transmission section 19 transmits and receives facsimiles over a public telephone line.

The network interface section 20 is a circuit provided with a communication module (for example, local area network (LAN) board). The network interface section 20 is connected for example to a LAN. The network interface section 20 performs data transmission with devices (external devices, including a server and a PC) located in the local network over the LAN. The network interface section 20 corresponds to the communication section 8 of the glossary management device 1 described above.

The storage section 21 is a circuit provided with a storage area for storing image data of originals and the local glossary 21a. The image data is generated by reading an original by the image reading section 12. The local glossary 21a corresponds to the local glossary 5a stored on the glossary management device 1 above. The storage section 21 may be a large capacity storage device (for example, hard disk drive (HDD).

The above has described the implementation of the glossary management device as the image forming apparatus 10. (Implementation of Glossary Management Device as Client-Server System)

Figure 3:
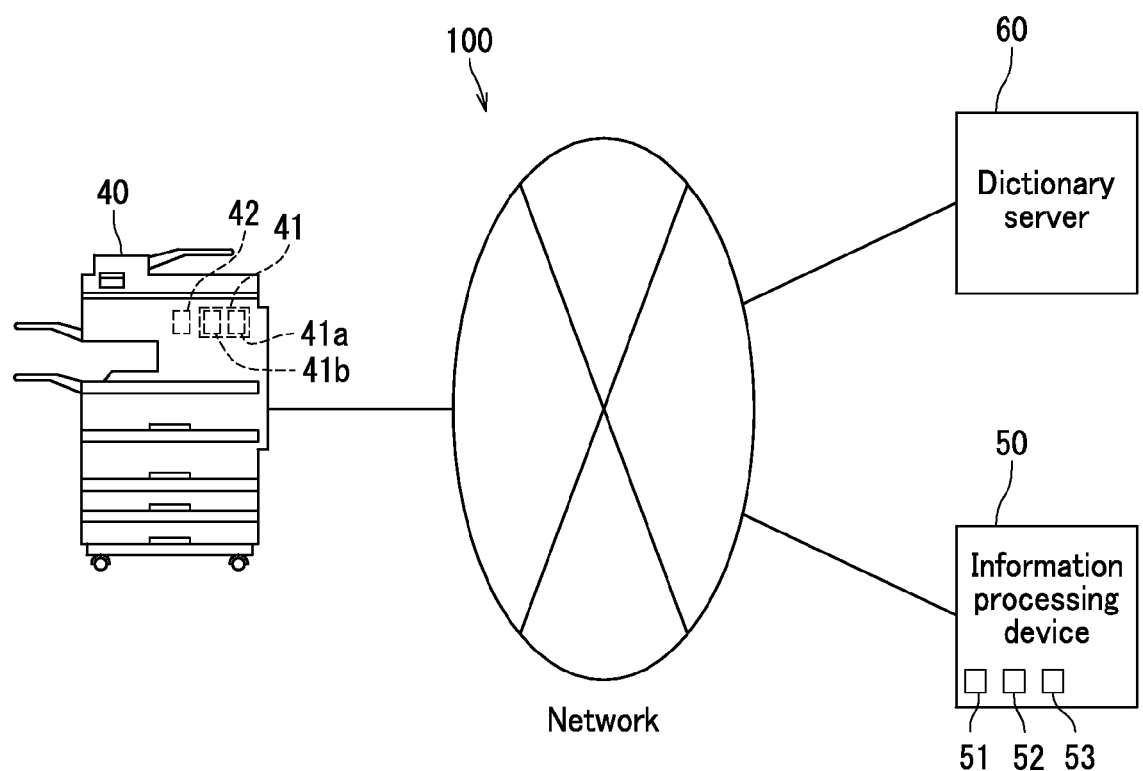
FIG. 3 shows a structure of a glossary management system having a client and server architecture.

The following now describes an implementation of the glossary management device as a glossary management system 100 having a client and server architecture. FIG. 3 shows a structure of the glossary management system 100.

The glossary management system 100 includes an image forming apparatus 40 and an information processing device 50. The glossary management system 100 is implemented by the image forming apparatus 40 and the information processing device 50 communicating with each other over a network. The glossary management system 100 may execute a process using a public dictionary server 60 that is an external server. The network may be connected to a user's PC (not illustrated).

The image forming apparatus 40 is a typical image forming apparatus with the addition of a functional section 41 that operates to collect text segments to be added to the local glossary. The image forming apparatus may include a processing section 42 that corresponds to a circuit for copying or printing a document. The functional section 41 that is additionally provided includes a collecting section 41a and a transmission section 41b. The collecting section 41a is a circuit that collects text segments to be added to the local glossary. More specifically, the collecting section 41a collects (extracts) text segments from a document during or after a common document-related job (such as copying or printing) of the document executed by a user on the image forming apparatus 40. Note that the job is executed for a purpose unrelated to the process of collecting text segments. In other words, during or after processing the conducted on a document by the processing section 42, the collecting section 41a collects text segments to be added to the local glossary from the document processed by the processing section 42. The collecting section 41a corresponds to a combination of the OCR processing section 11a, the acquiring section 11b, the analyzing section 11c, and the term matching section 11d of the glossary management device 1. The transmission section 41b is a circuit that transmits text segments collected by the collecting section 41a to the information processing device 50.

The information processing device 50 adds text segments received from the image forming apparatus 40 to the local glossary. The information processing device 50 includes a storage section 51, a receiving section 52, and a registering section 53. The storage section 51 is a circuit provided with a storage area for storing the local glossary. The receiving section 52 is a circuit that receives text segments transmitted from the image forming apparatus 40. The registering section 53 is a circuit that adds text segments received by the receiving section 52 to the local glossary. The local glossary is stored in the storage section 51. The storage section 51 and the registering section 53 respectively correspond to the storage section 21 and the registering section 11e of the glossary management device 1.

The public dictionary server 60 is provided with any number of public dictionaries. Each public dictionary is publicly available on a network such as the Internet and contains common terms.

Before adding a text segment to the local glossary, the information processing device 50 may check whether or not the text segment matches an entry word in the public dictionaries. More specifically, the information processing device 50 searches the public dictionary server 60 for an entry word matching the text segment. On finding an entry word matching the text segment on the public dictionary server 60, the information processing device 50 does not add the text segment to the local glossary. On not finding an entry word matching the text segment on the public dictionary server 60, the information processing device 50 adds the text segment to the local glossary. This prevents redundant addition of a term that is already in a public dictionary to the local glossary and thus the size of the local glossary is restricted. In addition, the local glossary is ensured to be a collection of terms closely related to the specific purpose of use.

The information processing device 50 may use a public dictionary to check whether or not a text segment that is composed only of alphabetic characters is a proper noun in the case where the document from which the text segment is extracted is an internal document of a specific organization such as a company and written in Japanese.

For example, where an internal document of a company written in Japanese includes a text segment that reads "Jupiter", the text segment is highly likely to be a project name or a code name of a new product. Note that the term "project" refers to a project being carried out in the company, and "new product" refers to a new product being developed by the company. In addition, the "alphabetic characters" may refer to the characters of the English alphabet.

The glossary management device 1, the image forming apparatus 10, and the information processing device 50 may each be internally provided with one or more public dictionaries.

The above has described the implementation of the glossary management device as the glossary management system 100 having a client and server architecture. Although the public dictionary server 60 is used in combination with the glossary management system 100, such a combination should not be construed as limiting. For example, the public dictionary server 60 may be used in combination with the glossary management device 1 or the image forming apparatus 10.

[Processing Flow]

Figure 4:
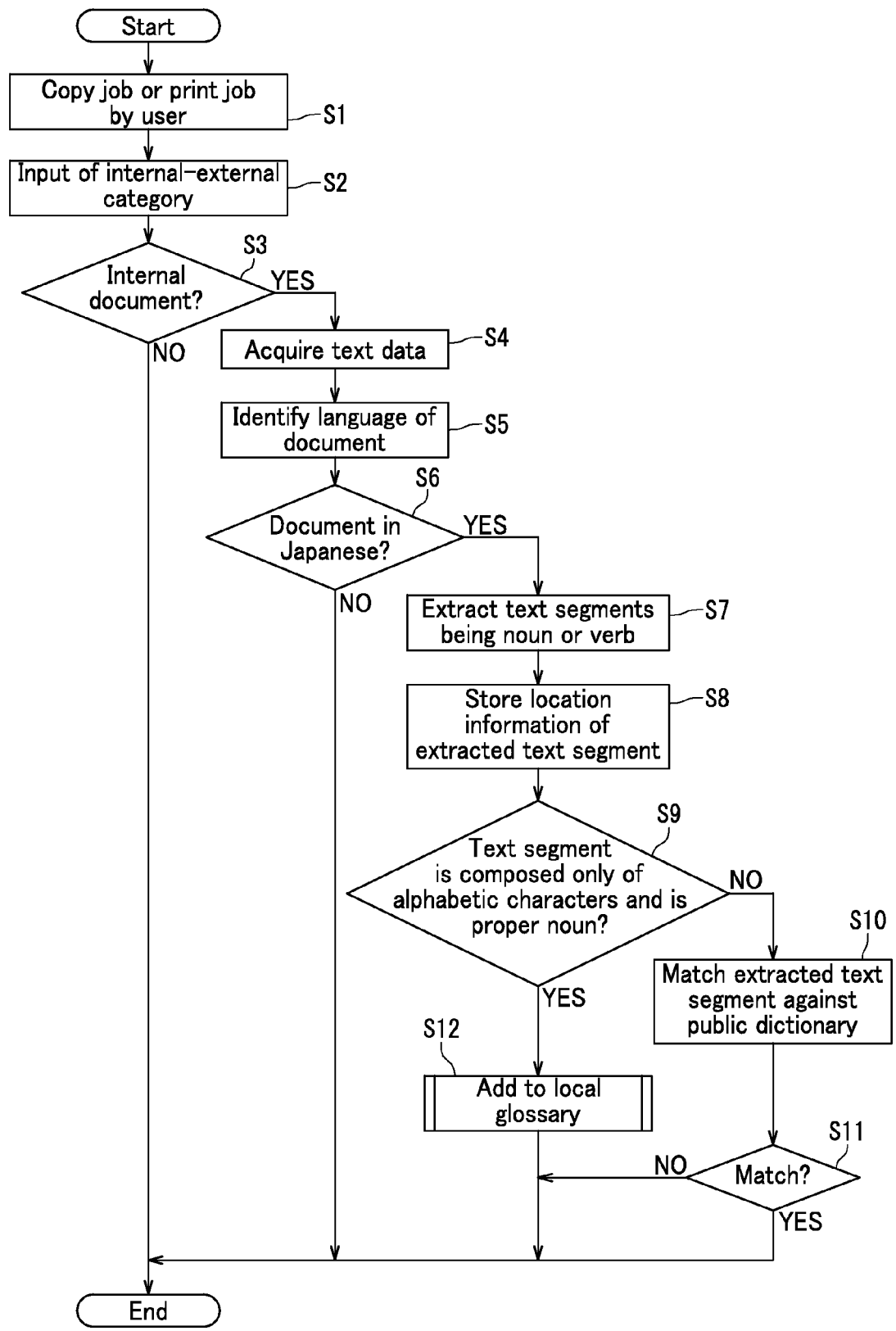
FIG. 4 shows processing steps performed by the glossary management device, from collecting text segments to adding text segments to a local glossary.

Next, the following describes a flow of processing by the glossary management device, from collecting text segments to adding the text segments to the local glossary 21a. FIG. 4 is a flowchart illustrating steps of processing by the glossary management device, from collecting text segments to adding the text segments to the local glossary 21a.

The following description is directed to a case where the glossary management device is implemented as the image forming apparatus 10 shown in FIG. 2. In addition, the glossary management device cooperates with the public dictionary server 60 residing on the network.

First, a user executes a copy job or a print job of a document on the image forming apparatus 10 (Step S1).

Next, the operation section 18 of the image forming apparatus 10 receives a user input designating an internal-external classification of the document that is copied or printed (Step S2). The internal-external classification indicates whether the document is classified as an internal document or an external document.

Next, the acquiring section 11b determines whether or not the document copied or printed in Step S1 is an internal document based on the internal-external category input in Step S2 (Step S3).

On determining that the document that is copied or printed in Step S1 is an internal document (Step S3: YES), the acquiring section 11b acquires text data of the document copied or printed (Step S4). The text data acquisition of Step S4 additionally involves conversion of image data into text data by the OCR processing section 11a in a situation in which the job in Step S1 involves reading of the document by the image reading section 12.

Next, the analyzing section 11c performs analysis of the text data acquired by the acquiring section 11b. More specifically, the analyzing section 11c analyzes the text data to identify the language (for example, Japanese, English, or another language) of the document corresponding to the text data (Step S5).

The language analysis may be made through use of a commonly known technique or through identification of the character type of a majority of characters contained in the text data. In a situation in which analysis of the alphabet type of the majority of characters is made for text data acquired from a document written in Japanese, the majority of characters are of either the Japanese Hiragana syllabary or the Japanese Katakana syllabary.

Alternatively, the language of the source document of the text data may be determined by the user.

Next, the analyzing section 11c determines whether or not the language of the document corresponding to the text data is Japanese based on the analysis (Step S6).

On determining that the document corresponding to the text data is written in Japanese (Step S6: YES), the analyzing section 11c then identifies the parts of speech of text segments contained in the text data through, for example, a morphological analysis and extracts each text segment that is a noun or a verb (Step S7).

The analyzing section 11c also acquires a piece of location information for each text segment extracted and stores the location information in the storage section 21 (Step S8) so as to be available for presentation to the user. The location information of each text segment extracted in Step S5 indicates the location of where in the source document the text segment is extracted from. In a case where a user uses a term listed in the local glossary 21a, the location information may be used to inform the user of the document and the location from which the term is extracted.

Next, for each text segment extracted in Step S7, the analyzing section 11c determines whether or not an extracted text segment currently processed satisfies both of the following: the text segment is a character string composed only of alphabetic characters; and the text segment is a proper noun (Step S9).

If the text segment is not a character string composed only of alphabetic characters and/or the text segment is not a proper noun (Step S9: NO), the term matching section 11d performs matching of the text segment against the public dictionaries on the public dictionary server 60 for an entry word matching the text segment (Step S10).

Next, the term matching section 11d determines whether or not there is a match (Step S11). If there is a match, it means that an entry term matching the text segment is found in the public dictionaries.

If Step S9 results in determination that the text segment is a character string composed only of alphabetic characters and also that the text segment is a proper noun (Step S9: YES) or if Step S11 finds no match (Step S11: NO), the registering section 11e adds the text segment to the local glossary 21a, together with the location information of the text segment (Step S12). The registration process of adding a text segment is described later in detail. Each piece of location information is stored in the storage section 21.

The above has described the flow of processing by the glossary management device, from collecting text segments to adding the text segments to the local glossary 21a. Note that Steps S8 through S12 are repeated for each text segment extracted in Step S7.

[Details of Registration Process to Local Glossary]

Figure 5:
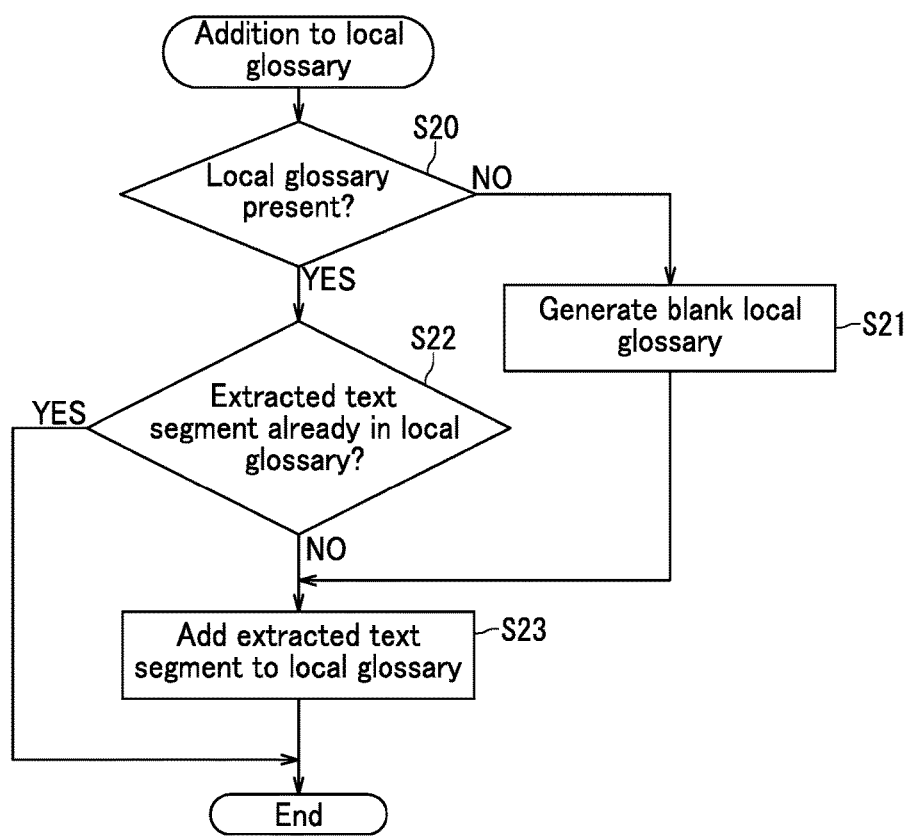
FIG. 5 shows details of the step of adding text segments to the local glossary.

The following describes the registration process of adding a text segment to the local glossary 21a. FIG. 5 shows the details of the step of adding a text segment to the local glossary 21a.

First, the registering section 11e determines whether or not the local glossary 21a has been already generated (Step S20).

If the local glossary 21a has not been generated yet (Step S20: NO), the registering section 11e generates an empty local glossary 21a that is only a framework of the local glossary 21a with no entry (Step S21).

If the local glossary 21a has already been generated (Step S20: YES), the registering section 11e determines whether or not a text segment currently processed is already in the local glossary 21a (Step S22).

If the text segment is not in the local glossary 21a (Step S22: NO), the registering section 11e adds the text segment to the local glossary 21a together with the location information of the text segment (Step S23).

The above has described the registration processing of adding a text segment to the local glossary 21a.

[Supplemental]

It should be naturally appreciated that the present disclosure is not limited to the embodiment described above and various alterations may be made without departing from the essence of the present disclosure.

What is claimed is:

1. A glossary management device comprising:
   a read circuit that reads a document;
   a storage circuit that has a storage area for a glossary to which text segments extracted from the document that is read by the read circuit are to be added as entry terms;
   an acquisition circuit that acquires text data of the document;
   an analysis circuit that
      performs analysis of the text data acquired by the acquisition circuit to identify a language of the document and parts of speech of text segments in the text data and
      extracts one or more text segments from the document based on the analysis;
   a term matching circuit that performs matching for each of the extracted text segments against a public dictionary containing entry terms registered therein; and
   a registration circuit that adds to the glossary, each extracted text segment that does not match any entry term in the public dictionary, wherein
   the analysis circuit determines whether or not each extracted text segment is a proper noun,
   if the analysis circuit determines that the extracted text segment is not a proper noun,
      the term matching circuit performs matching of the extracted text segment against the public dictionary, and
      the registration circuit adds the extracted text segment to the glossary if the extracted text segment does not match any entry term in the public dictionary, and
   if the analysis circuit determines that the extracted text segment is a proper noun,
      the registration circuit adds the extracted text segment to the glossary without the term matching circuit performing matching of the extracted text segment against the public dictionary.

2. The glossary management device according to claim 1, wherein
   the acquisition circuit
   receives a user input designating an internal-external classification of the document, and
   determines that the document is an internal document and acquires text data of the document if the internal-external classification indicates that the document is classified as an internal document.

3. The glossary management device according to claim 2, wherein the analysis circuit extracts each text segment that is analyzed to be a noun.

4. The glossary management device according to claim 1, wherein the read circuit comprises a scanner that reads the document to generate image data.

5. The glossary management device according to claim 1, wherein
   the registration circuit adds to the glossary, together with each text segment added to the glossary, a piece of location information, and
   each piece of location information indicates a location of where in the document a corresponding text segment is extracted.

6. A glossary management system comprising:
   an image forming apparatus; and
   an information processing device that communicates with the image forming apparatus over a network, wherein
   the image forming apparatus includes
   a processing circuit that executes a job of copying or printing a document,
   a collection circuit that collects from the document, text segments to be added to a glossary as entry terms, and
   a transmission circuit that transmits the text segments collected by the collection circuit to the information processing device,
   the information processing device includes
   a storage circuit that has a storage area for the glossary,
   a reception circuit that receives the text segments transmitted from the information processing device, and
   a registration circuit that adds each of the text segments received by the reception circuit to the glossary, the collection circuit includes
an acquisition circuit that acquires text data of the document,
an analysis circuit that
- performs analysis of the text data acquired by the acquisition circuit to identify a language of the document and parts of speech of text segments in the text data and
- extracts one or more text segments from the document based on the analysis, and a term matching circuit that performs matching for each of the extracted text segments against a public dictionary containing entry terms registered therein,
the analysis circuit determines whether or not each extracted text segment is a proper noun,
if the analysis circuit determines that the extracted text segment is not a proper noun,
- the term matching circuit performs matching of the extracted text segment against the public dictionary, and
- the registration circuit adds the extracted text segment to the glossary if the extracted text segment does not match any entry term in the public dictionary, and if the analysis circuit determines that the extracted text segment is a proper noun,
- the registration circuit adds the extracted text segment to the glossary without the term matching circuit performing matching of the extracted text segment against the public dictionary.

7. The glossary management device according to claim 6, wherein
the transmission circuit transmits each extracted text segment that does not match any entry term in the public dictionary to the information processing device.

8. A non-transitory computer-readable recording medium storing a glossary management program executable by a computer, the glossary management program comprising:
- a first program code that causes the computer to acquire text data of a document;
- a second program code that causes the computer to
  - perform analysis of the text data to identify a language of the document and parts of speech of text segments in the text data and
  - extract one or more text segments from the document based on the analysis;
- a third program code that causes the computer to perform matching for each of the extracted text segments against a public dictionary containing entry terms registered therein; and
- a fourth program code that causes the computer to add to a glossary, each extracted text segment that does not match any entry term in the public dictionary, wherein the second program code causes the computer to determine whether or not each extracted text segment is a proper noun,
if the computer determines that the extracted text segment is not a proper noun,
- the third program code causes the computer to perform matching of the extracted text segment against the public dictionary, and
- the fourth program code causes the computer to add the extracted text segment to the glossary if the extracted text segment does not match any entry term in the public dictionary, and if the computer determines that the extracted text segment is a proper noun,
- the fourth program code causes the computer to add the extracted text segment to the glossary without the third program code causing the computer to perform matching of the extracted text segment against the public dictionary.

9. The glossary management device according to claim 2, wherein
the analysis circuit determines whether or not the language of the document is Japanese and extracts one or more text segments that are composed only of alphabetic characters from the document if the language of the document is Japanese.

10. The glossary management system according to claim 6, wherein
the acquisition circuit
receives a user input designating an internal-external classification of the document, and
determines that the document is an internal document and acquires text data of the document if the internal-external classification indicates that the document is classified as an internal document.

11. The glossary management system according to claim 10, wherein
the analysis circuit determines whether or not the language of the document is Japanese and extracts one or more text segments that are composed only of alphabetic characters from the document if the language of the document is Japanese.

12. The non-transitory computer-readable recording medium according to claim 8, wherein
the first program code causes the computer to
receive a user input designating an internal-external classification of the document, and
determine that the document is an internal document and acquire text data of the document if the internal-external classification indicates that the document is classified as an internal document.

13. The non-transitory computer-readable recording medium according to claim 12, wherein
the second program code causes the computer to determine whether or not the language of the document is Japanese and extract one or more text segments that are composed only of alphabetic characters from the document if the language of the document is Japanese.

* * * * *